(12) United States Patent
Mori et al.

(10) Patent No.: US 6,326,086 B1
(45) Date of Patent: Dec. 4, 2001

(54) SHEET FOR MOLDED-IN FOIL DECORATION AND METHOD OF PRODUCING MOLDED RESIN HAVING MOLDED-IN FOIL DECORATION BY USING THE SHEET

(75) Inventors: Fujio Mori; Takuji Shibata; Tsuneyuki Yamanaka, all of Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 09/147,890

(22) PCT Filed: Jul. 21, 1998

(86) PCT No.: PCT/JP98/03245
§ 371 Date: Mar. 19, 1999
§ 102(e) Date: Mar. 19, 1999

(87) PCT Pub. No.: WO99/04946
PCT Pub. Date: Feb. 4, 1999

(30) Foreign Application Priority Data

Jul. 22, 1997 (JP) .................................................. 9-212598
Mar. 13, 1998 (JP) ................................................ 10-082739

(51) Int. Cl.⁷ .................................................. B32B 27/08
(52) U.S. Cl. .................... 428/516; 428/500; 428/515; 428/519; 428/520; 428/522
(58) Field of Search .................................. 428/500, 515, 428/516, 519, 520, 522

(56) References Cited

U.S. PATENT DOCUMENTS

| | | | |
|---|---|---|---|
| 4,810,540 | 3/1989 | Ellison et al. | 428/31 |
| 5,074,770 | * 12/1991 | Graefe | 425/117 |
| 5,725,712 | * 3/1998 | Spain et al. | 156/230 |
| 5,908,594 | * 6/1999 | Gownder et al. | 264/210.7 |

FOREIGN PATENT DOCUMENTS

| | | |
|---|---|---|
| 2-503077 | 9/1990 | (JP) . |
| 6-26718 | 4/1994 | (JP) . |
| 8-183064 | 7/1996 | (JP) . |
| 9-141790 | 6/1997 | (JP) . |
| 9-193189 | 7/1997 | (JP) . |
| 9-300397 | 11/1997 | (JP) . |
| WO-97/44389 | * 11/1997 | (JP) . |
| 88/07416 | 10/1988 | (WO) . |

* cited by examiner

Primary Examiner—Blaine Copenheaver
Assistant Examiner—Christopher Paulraj
(74) Attorney, Agent, or Firm—Wenderoth, Lind & Ponack, LLP

(57) ABSTRACT

A foil-decorating sheet comprised by a laminated film of two or more kinds of films which is to be set in an injection mold for being integrally bonded to a surface of a molding resin, wherein after a foil-decorating is made, a bonding surface-side film of the laminated film which is bonded to the molding resin has a peel strength of not less than 1 kgf/inch width at least at an interface between the surface film of the laminated film bonded to the molding resin and the molding resin, and wherein at least a transparent acrylic film is laminated on the bonding surface-side film bonded to the molding resin, with a decorative layer formed between the bonding surface-side film bonded to the molding resin and the acrylic film.

4 Claims, 5 Drawing Sheets

SHEET FOR MOLDED-IN FOIL DECORATION AND METHOD OF PRODUCING MOLDED RESIN HAVING MOLDED-IN FOIL DECORATION BY USING THE SHEET

TECHNICAL FIELD

The present invention relates to a foil-decorating sheet, which is used for decorating at the same time as molding, for use in decorating the surface of molded articles of three-dimensional shape including interior automotive trims, such as console box, center cluster, and switch base, and exterior automotive trims, such as side mudguard, bumper, wheel cover, and molding, and a method of producing a foil-decorated resin article using such a sheet.

BACKGROUND ART

Foil-decorating sheets for use in decorating interior automotive trims and exterior automotive trims are strictly required to have good weathering characteristic, good three-dimensional formability, and good transparency.

Hitherto, a foil-decorating sheet having such characteristics has been known such that a decorative layer is formed on an acrylic film. For production of a foil-decorated resin article using such a sheet, the following method has been known. The method comprises setting a foil-decorating sheet in an injection mold, clamping the mold, injecting a molding resin mass into a cavity, and allowing the molding resin to set, whereby simultaneously with the formation of a resin molded article, the foil-decorating sheet is integrally bonded to the surface of the resin molded article. In the case of interior automotive trims or exterior automotive trims, polypropylene resin or acrylonitrile butadiene-styrene resin is generally used as the molding resin.

Usually, however, the acrylic film which constitutes the foil-decorating sheet and the polypropylene resin which constitutes the molding resin are considerably different from each other in shrinkage factor; and therefore, their relative adhesion behavior is unsatisfactory. This poses an issue that, in the resulting foil-decorated resin article, the acrylic film will become peeled from the polypropylene resin molded article.

Another issue is that since an acrylic film is brittle and liable to break, the film may be damaged when the film is three-dimensionally preformed or set in a mold.

Therefore, it is an object of the present invention to provide a foil-decorating sheet which can exhibit high adhesion to a molding resin, is not liable to become peeled from the molding resin, and is applicable to a three-dimensionally configured molded article and, in particular, to a deep-drawn molded article, and a method of producing a foil-decorated resin article using such a sheet.

DISCLOSURE OF INVENTION

In order to accomplish above mentioned object, the present invention may be constructed below.

According to a first aspect of the invention, there is provided a foil-decorating sheet comprised of a laminate of two or more kinds of films which is to be set in an injection mold for being integrally bonded to a surface of a molding resin, wherein after foil-decorating is made, a surface film of the laminated film which is bonded to the molding resin has a peel strength of not less than 1 kgf/inch width at least at the interface between the surface film of the laminated film bonded to the molding resin and the molding resin, and wherein at least a transparent acrylic film is laminated on the surface film bonded to the molding resin, with a decorative layer formed between the surface film bonded to the molding resin and the acrylic film.

According to a second aspect of the invention, there is provided a foil-decorating sheet as defined in the first aspect, wherein when a tensile test is carried out with a test specimen, 80 mm wide, of the foil-decorating sheet held between a pair of chucks fixed at a distance of 100 mm between opposite chuck end edges, by applying a load at constant rate of 100 mm/min to the test specimen at 20 one end thereof under an ambient temperature condition of 110° C., the test specimen exhibits a tensile elongation at break of not less than 150%.

According to a third aspect of the invention, there is provided a foil-decorating sheet as defined in the second aspect, wherein within a range of up to an upper limit of tensile elongation at break of the laminated film, constituent films of the laminated film have an applied load difference within a range of up to 5.0 kg maximum in their respective elongation values.

According to a fourth aspect of the invention, there is provided a foil-decorating sheet as defined in the second or third aspect, wherein the sheet has a portion which can be elongated more than 200% in unit area to preform a three-dimensional configuration.

According to a fifth aspect of the invention, there is provided a foil-decorating sheet as defined in any one of the first through fourth aspects, wherein the surface film of the laminated film which is bonded to the molding resin is a polypropylene film.

According to a sixth aspect of the invention, there is provided a foil-decorating sheet as defined in the fifth aspect, wherein the polypropylene film is formed of a non-crystalline or low-crystalline polypropylene resin.

According to a seventh aspect of the invention, there is provided a foil-decorating sheet as defined in the fifth or sixth aspect, wherein the polypropylene film is comprised of a polypropylene resin loaded with a styrene elastomer resin.

According to an eighth aspect of the invention, there is provided a foil-decorating sheet as defined in any one of the fifth through seventh aspects, wherein the polypropylene film is comprised of a soft propylene resin polymerized by a metallocene catalyst.

According to a ninth aspect of the invention, there is provided a foil-decorating sheet as defined in any one of the first through fourth aspects, wherein the surface film of the laminated film which is bonded to the molding resin is an acrylonitrile butadiene-styrene film.

According to a tenth aspect of the invention, there is provided a foil-decorating sheet as defined in the ninth aspect, wherein the proportion of the butadiene content in the copolymerization ratio of the acrylonitrile butadiene-styrene film is 20 to 50% by weight.

According to an eleventh aspect of the invention, there is provided a foil-decorating sheet as defined in any one of the first through tenth aspects, wherein a colored layer or a colored film is provided under the decorative layer, and wherein a color of a base layer which constitutes the decorative layer and a color of the colored layer or the colored film are isochromatic.

According to a twelfth aspect of the invention, there is provided a foil-decorating sheet as defined in any one of the first through tenth aspects, wherein the surface film of the laminated film which is bonded to the molding resin is a colored film, and wherein a color of a base layer of the decorative layer and a color of the colored film are isochromatic.

According to a thirteenth aspect of the invention, there is provided a foil-decorating sheet as defined in any one of the eleventh and twelfth aspects, wherein there is a chromaticity difference between the color of the base layer for the decorative layer and the color of the colored layer or the colored film, the chromaticity difference being a value expressed by the following relation:

$$4.0 \leq \sqrt{(\Delta a^*)^2 + (\Delta b^*)^2} \leq 45.0$$

(where, $a^*$, $b^*$ denotes specification units in the $L^* a^* b^*$ calorimetric system having perceptibly substantially equal chromaticness, as recommended by International Commission on Illumination in 1976, in which $a^*=500 [(X/X_0)^{1/3}-(Y/Y^0)^{1/3}-]$, $b^*=200 [(Y/Y^0)^{1/3}-(Z/Z^0)]$, wherein $L^*$ denotes lightness index defined as $L^*=116 (Y/Y^0)^{1/3}-16$; X, Y, Z denotes stimulus values felt by three chromatic characteristics of luminosity respectively at the sight of the color of an object with human eyes, $X_0$, $Y^0$, $Z^0$ denotes stimulus values felt by three chromatic characteristics of luminosity respectively at the sight of the illumination source with human eyes; in the case of the standard illuminant C, $X_0=98.072$, $Y^0=100$, and $Z_0=118.225$, and in the case of the standard illuminant $D_{65}$, $X_0=95.045$, $Y^0=100$, and $Z_0=108.892$).

According to a fourteenth aspect of the invention, there is provided a method of producing a foil-decorated resin molded article which comprises: setting in an injection mold a three-dimensionally preformed foil-decorating sheet as defined in any one of the first through thirteenth aspects; clamping the mold; injecting a molding resin mass in molten state into a cavity; solidifying the molding resin to form a resin molded article; and simultaneously therewith causing the foil-decorating sheet to go into integral bond with a surface of the resin molded article.

According to a fifteenth aspect of the invention, there is provided a method of producing a foil-decorated resin molded article which comprises: setting in an injection mold a foil-decorating sheet as defined in any one of the first through thirteenth aspects, preforming the sheet three-dimensionally within the mold; then clamping the mold; injecting a molding resin mass in molten state into a cavity; solidifying the molding resin to form a resin molded article, and simultaneously therewith causing the foil-decorating sheet to go into integral bond with a surface of the resin molded article.

BRIEF DESCRIPTION OF DRAWINGS

These and other aspects and features of the present invention will become clear from the following description taken in conjunction with the preferred embodiments thereof with reference to the accompanying drawings, in which.

BEST MODE FOR CARRYING OUT THE INVENTION

Figure 1:
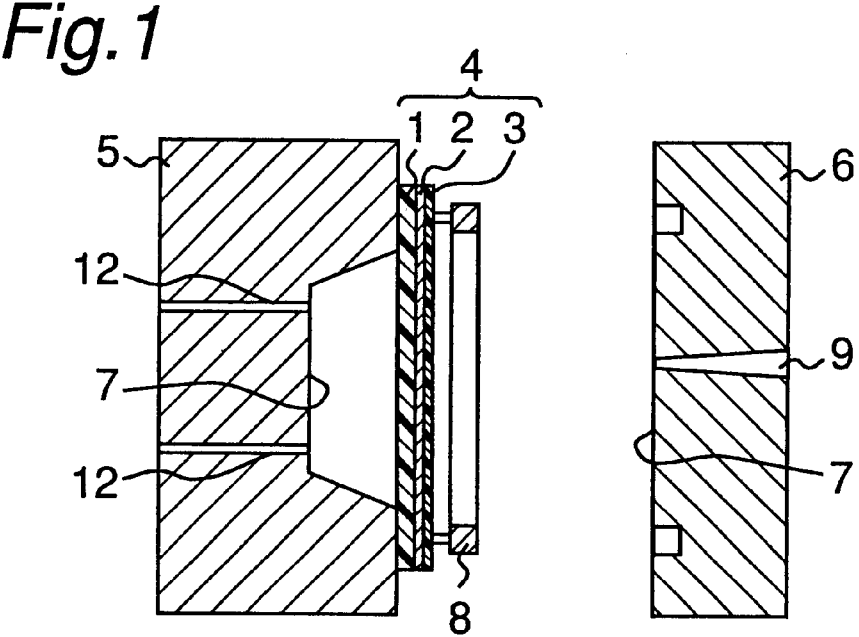
FIG. 1 is a sectional view showing one of the processes in a method of producing a foil-decorated resin molded article using a foil-decorating sheet in one embodiment of the present invention.

Before the description of the present invention proceeds, it is to be noted that like parts are designated by like reference numerals throughout the accompanying drawings.

Figure 2:
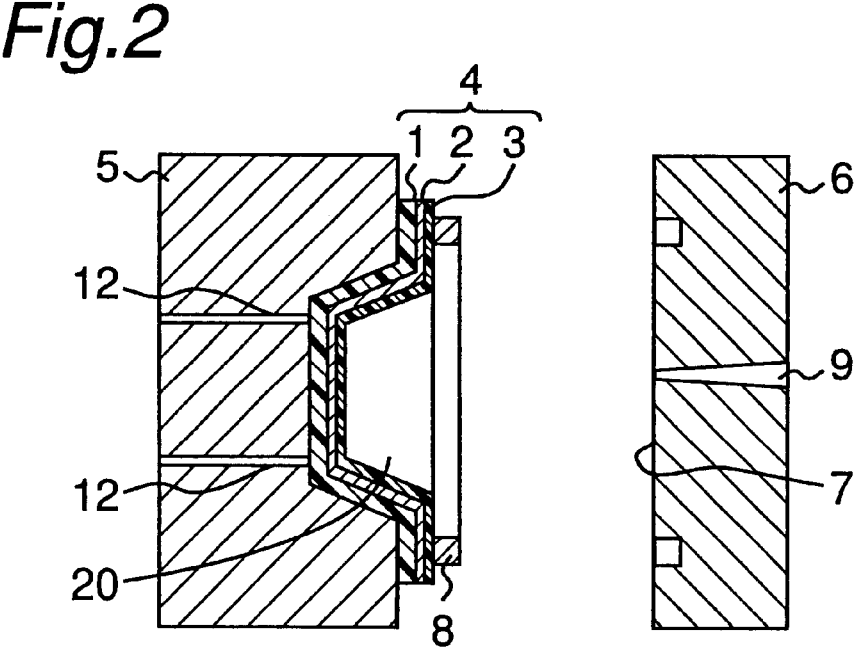
FIG. 2 is a sectional view showing one of the processes in the method of producing a foil-decorated resin molded article in aforesaid embodiment of the invention.
Figure 3:
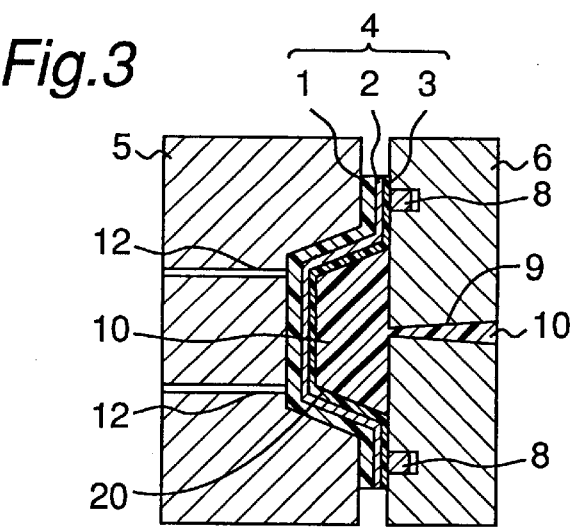
FIG. 3 is a sectional view showing one of the processes in the method of producing a foil-decorated resin molded article in aforesaid embodiment of the invention.
Figure 4:
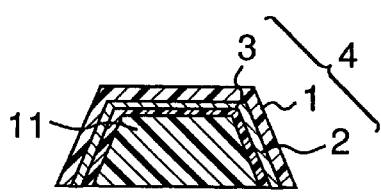
FIG. 4 is a sectional view showing a foil-decorated resin molded article as obtained according to the method of producing a foil-decorated resin molded article in aforesaid embodiment of the invention.
Figure 5:
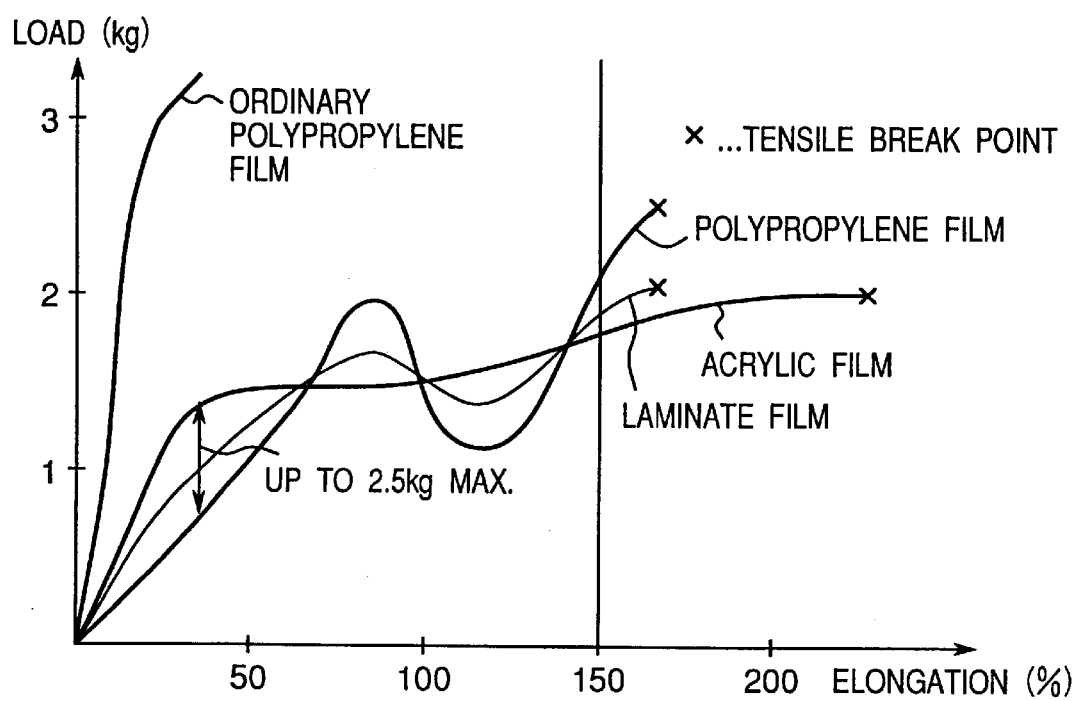
FIG. 5 is a graph showing curves indicating tensile elongation and load of the foil-decorating sheet and the like in aforesaid embodiment.
Figure 10:
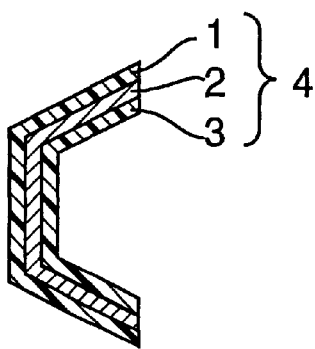
FIG. 10 is a sectional view showing a three-dimensionally preformed foil-decorating sheet for use in the method of producing a foil-decorated resin molded article of aforesaid modified form of the embodiment of the invention.
Figure 11:
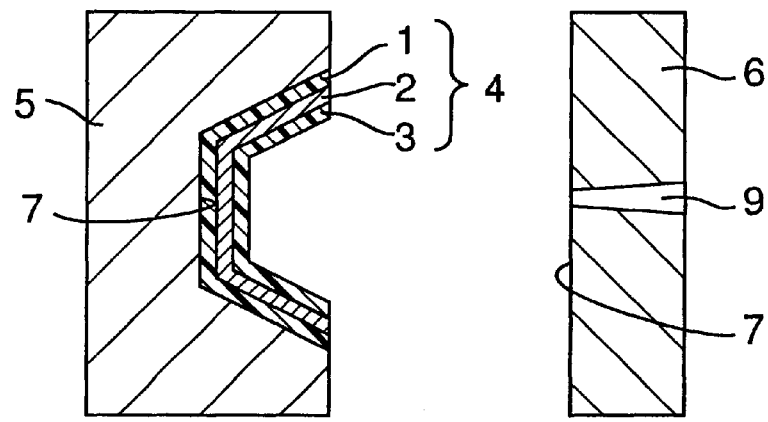
FIG. 11 is a sectional view showing one of the processes involved in the method of producing a foil-decorated resin article of aforesaid modified form of the embodiment of the invention.
Figure 12:
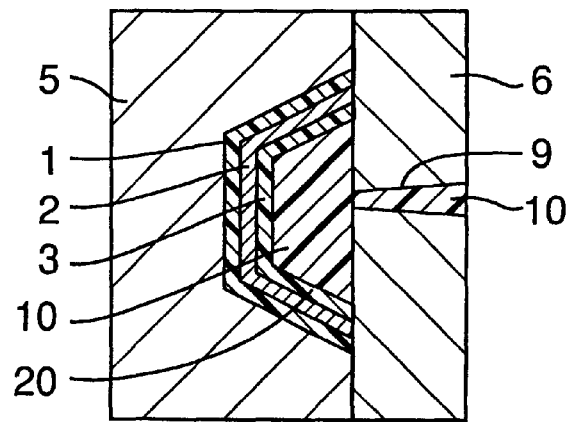
FIG. 12 is a sectional view showing one of the processes involved in the method of producing a foil-decorated resin article of aforesaid modified form of the embodiment of the invention.
Figure 13:
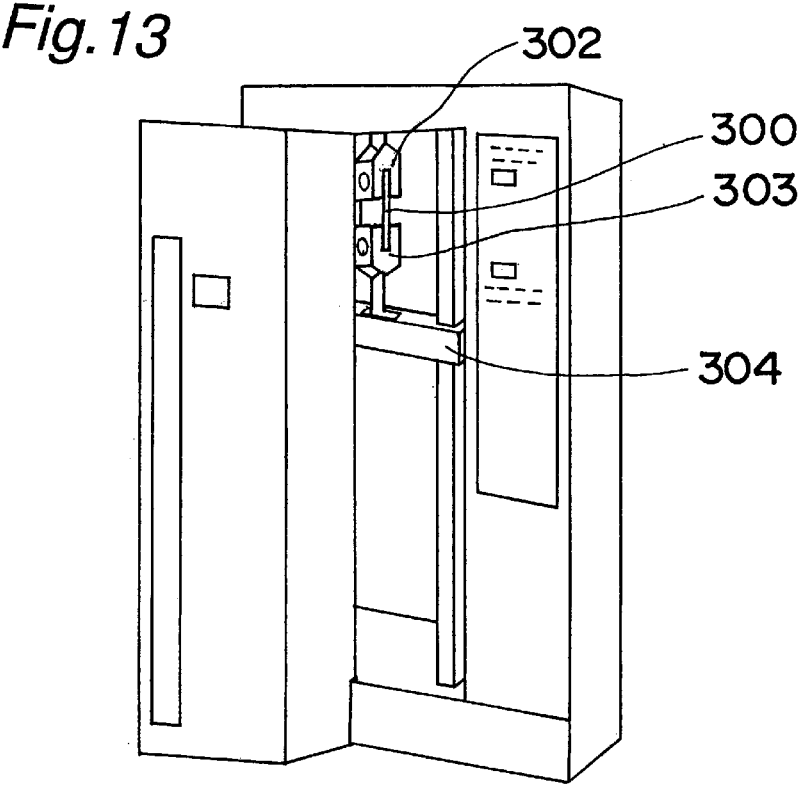
FIG. 13 is a perspective view showing an apparatus for measuring tensile elongation at break of foil-decorating sheets of the aforesaid embodiment of the invention and various modified forms of the embodiment.
Figure 14:
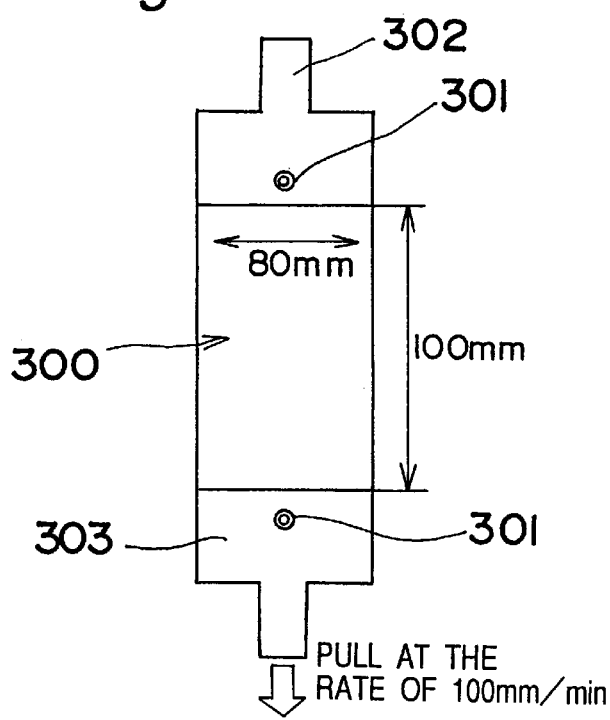
FIG. 14 is a plan view showing a portion of the apparatus for measuring tensile elongation at break at which a test specimen is fixed.
Figure 15:
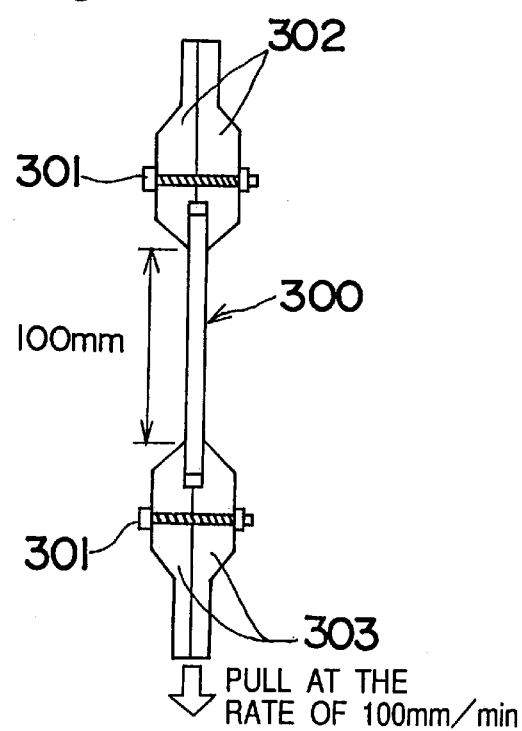
FIG. 15 is a sectional view showing a portion of the apparatus for measuring tensile elongation at break at which a test specimen is fixed.

FIGS. 1 to 3 are sectional views which illustrate one embodiment of the invention, showing in particular respective one of processes in a method of producing a foil-decorated resin molded article using a foil-decorating sheet which is used for decorating at the same as molding. FIG. 4 is a sectional view showing a foil-decorated resin molded article obtained by the method of producing a foil-decorated resin molded article according to the embodiment of the invention. FIG. 5 is a graph showing tensile elongation load curves of the foil-decorating sheet and the like of the embodiment. FIGS. 6 through 9 are sectional views showing various modified forms of the embodiment of the invention. FIG. 10 is a sectional view showing a three-dimensionally preformed foil-decorating sheet to be used in the method of producing a foil-decorated resin molded article according to a modified form of the embodiment of the invention. FIGS. 11 and 12 are sectional views showing respective one of processes of operation in the method of producing a foil-decorated resin molded article according to the modified form of the embodiment of the present invention. FIG. 13 is a perspective view showing an apparatus for measuring tensile elongation at break with respect to foil-decorating sheets of aforesaid embodiment and modified form thereof. FIG. 14 is a plan view showing a test specimen fixing portion of the apparatus for measuring tensile elongation at break. FIG. 15 is a sectional view showing the test specimen fixing portion of the apparatus for measuring tensile elongation at break.

In the drawings, reference numeral 1 denotes an acrylic film; 2 denotes a decorative layer; 3 denotes a bonding surface-side film to be bonded to a molding resin (a film at the bonding surface-side); 4 denotes a foil-decorating sheet of the above mentioned embodiment; 5 denotes a movable mold of an injection mold; 6 denotes a stationary mold of the injection mold to which the movable mold 5 is clamped; 7 denotes respective cavity forming surfaces of the movable mold 5 and stationary mold 6 of the injection mold; 8 denotes a pair of i.e. upper and lower rod-like or square frame-shaped clamp members, for fixing the foil-decorating sheet 4 to the stationary mold 6 of the injection mold; 9 denotes a gate portion for molding resin which is provided in the movable mold 5 of the injection mold; 10 denotes a molding resin inserted into a cavity 20 defined by the movable mold 5 and stationary mold 6 of the injection mold; 11 denotes a resin molded article which is formed through solidification of the molding resin 10; 12 denotes a vacuum suction hole provided on the movable mold 5 of the mold which is connected to a vacuum suction device for sucking the foil-decorating sheet 4 to conduct the sheet along a cavity defining surface 7 of the cavity 20; 13 denotes a bonding layer provided in the foil-decorating sheet 4 between the decorative layer 2 and the bonding surface-side film 3; 14 denotes a wood grain duct decorative layer, 15 denotes a base layer having the wood grain duct decorative layer; 16 denotes a colored layer; and 17 denotes a colored film.

In the above mentioned embodiment of the present invention, the foil-decorating sheet 4 is a foil-decorating sheet 4 having two or more kinds of laminate films wherein, after foil-decorating, the bonding surface-side film 3 of the laminate films which is bonded to the molding resin has a peeling strength of not less than 1 kgf/inch width at least in the interface between the bonding surface-side film 3 bonded to the molding resin 10 and the molding resin 10, with at least a transparent acrylic film 1 laminated thereon so that the decorative layer 2 is formed between the two layers 3 and 1 (see FIGS. 1 through 4). After foil-decorating, a corresponding endurance is required of the resulting foil-decorated molded article. In particular, automotive parts are required to have severe resistance characteristics, such as heat resistance, water vapor resistance, light resistance, and water resistance. In that case, if the initial peeling strength is low, the strength is lowered with time, which may sometimes cause cracks. Tests were made to find an initial peeling strength which would ensure the retention of adhesion performance after endurance tests, and as a result it was found that at least a widthwise strength of not less than 1 kgf/inch was required. Laminate films which can meet such requirement are such that component resins of such films are identical or similar, for example, a combination of polypropylene and polyethylene, both olefin-based (hydrocarbon-based) materials, and a combination of acrylonitrile butadiene styrene and acrylonitrile styrene, both acrylonitrile copolymers. The transparent acrylic film 1 herein embraces semitransparent films, films colored with light yellow etc., or films rendered flatting through inclusion of an extender pigment, as long as the decorative layer 2 is kept visible.

As an example of the foil-decorating sheet 4 of such construction, mention may be made of an acryl-polypropylene laminated film or acryl-polyethylene laminated film such that a bonding surface-side film 3, such as polypropylene film or polyethylene film, which has good adhesion behavior in relation to polypropylene molding resin 10 is laminated on acrylic film 1. As another example of the foil-decorating sheet 4 mention may be made of an acryl-acrylonitrile butadiene styrene laminated film or an acryl-acrylonitrile styrene laminated film such that a bonding surface-side film 3, such as acrylonitrile butadiene styrene film or acrylonitrile styrene film, which has good adhesion behavior in relation to acrylonitrile butadiene styrene resin is laminated on acrylic film 1. In such foil-decorating sheets 4, after foil-decorating, the bonding surface-side film 3 which is bonded to the molding resin 10 has a peeling strength of not less than 1 kgf/inch width at least at the interface between the bonding surface-side film 3 bonded to the molding resin 10 and the molding resin 10 and, therefore, has high adhesion characteristic in relation to the molding resin 10, so that such foil-decorating sheets 4 will not peel from the molding resin 10. Further, since the acrylic film 1 which is brittle and may easily break is supported on the bonding surface-side film 3 bonded to the molding resin 10, the foil-decorating sheet 4 will not be damaged.

However, in such laminate films, materials of the films are often different in thermal properties and mechanical properties, and this may be a cause of inconvenience during the process of three-dimensional preforming.

The reason for this is that whereas acrylic film can be converted into a three-dimensional configuration when heated to a temperature equal to or higher than its softening point range of 60° C. to 90° C., polypropylene film which is used in acryl-polypropylene laminated films has a higher softening point range on the order of 130° C. to 160° C. and, therefore, could not be converted into a three-dimensional configuration at temperatures in the softening point range of acrylic films. If an attempt is made to forcibly cause the polypropylene film to follow the configuration change of the acrylic film so as to be converted into a three-dimensional configuration, peeling may occur between the acrylic film and polypropylene film, or the polypropylene film may be fractured.

In the case of an acryl-acrylonitrile butadiene styrene laminated film, the softening point of the acrylonitrile butadiene styrene film is relatively high on the order of 120° C. to 160° C. Therefore, if a forced configuration change is attempted, the acrylic film is locally stretched to cause a pattern collapse in the decorative layer.

Therefore, such a laminated film may not be applicable to three-dimensionally configured molded articles, for example, and more particularly deep-drawn molded articles, such as console box having a deep bottom, depending upon differences in elongation characteristic under heating conditions between the acrylic film and the bonding surface-side film which is bonded to the molding resin.

In pursuit of the cause of above mentioned inconvenience, the present inventors took up the vacuum forming method as an example of three-dimensional preforming with respect to various kinds of laminate films. As a result, it was found that such inconvenience was due to differences in softening points of constituent films of such a laminated film. That is, when vacuum forming is carried out under proper temperature conditions for the film having a higher softening point, the film having a lower softening point may become punctured, discolored, or buckled under the influence of heat. Whilst, the film having the higher softening point cannot be changed in configuration when vacuum forming is carried out under proper temperature conditions for the film having the lower softening point.

In order to solve this issue, for above described embodiment of the present invention, materials and the like of films having a higher softening point (in the foregoing case, polypropylene film or acrylonitrile butadiene styrene film) were examined, and a material having mechanical characteristics similar to those of the film having the lower softening point (in the foregoing case, acryl film) was selected. A temperature range suitable for three-dimensionally preforming the film having the lower softening point i s in the vicinity of 110° C. to 130° C. Tensile tests were made at 110° C., the lowest working temperature of the temperature range, and test results tell that a film material having a mechanical characteristic such that a material capable of being elongated 150% or more can be converted, even singly, into a very deep three-dimensional configuration. In the case of laminated sheets, therefore, by selecting a material which can conform to such a characteristic, it is possible to obtain a sheet consisting of two or more kinds of laminate layers having different properties, resulting in that the sheet can easily be three-dimensionally preformed.

In other words, in the foregoing embodiment, it is desirable to arrange that when a tensile test is carried out with a test specimen 300, 80 mm wide, of the foil-decorating sheet 4 held between a pair of chucks 302, 303 and fixed at a distance of 100 mm between opposite edges of the chucks (see FIGS. 14, 15) by applying a load at constant rate of 100 mm/min to the test specimen 300 at one end of the test specimen 300 under an ambient temperature condition of 110° C., the test specimen exhibits a tensile elongation at break of not less than 150% (see FIGS. 13 to 15). By so arranging, it is possible to obtain a foil-decorating sheet such that when the sheet is subjected to configuration change under heating there is no possibility of peeling between laminate films or fracture of one laminate film alone, so that the sheet can be converted, into a three-dimensional configuration without difficulty.

The expression ambient temperature used herein means the temperature in the atmosphere in which test specimen 300 was actually tested. As shown in FIGS. 13–15, the test specimen 300 is a specimen of the foil-decorating sheet 4 cut to a size, 80 mm wide, which enables tensile testing of the specimen held between the pair of chucks 302, 303 at a distance of 100 mm between the opposite edges of the chucks. The size of foil-decorating sheet 4 actually produced to obtain a foil-decorated resin molded article 11 was: in the case of automotive exterior trims, 200 mm×1500 mm for molding, 800 mm×800 mm for wheel cover, 400 mm×1500 mm for side mudguard, 400 mm×2000 mm for bumper, and 300 mm×400 mm for console box; and in the case of automotive interior trims, 350 mm×450 mm for center cluster, and 200 mm×250 mm for switch base. Therefore, on the basis of the width to length ratio which was about 8:10 in foil-decorating sheets for console box, center cluster, and switch base, with a test specimen 300, 80 mm wide, held between the pair of chucks 302, 303, the distance between the opposite edges of the chucks was set at 100 mm. In the case of molding, side mudguard, bumper, and wheel cover, the ratio is different from the above mentioned ratio, but by carrying out 80 mm×100 mm tests when three-dimensional preforming of the foil-decorating sheet is carried out, it is possible to find out the behavior of the foil-decorating sheet as a whole. Therefore, aforesaid size was adopted. Referring to FIGS. 13 to 15, it is noted that the upper side pair of chucks 302, with the upper end of test specimen 300 held between them, is fixed by means of a screw 301. The lower side pair of chucks 303, with the lower end of the test specimen 300 held between them, is fixed by means of a screw 301. As FIG. 13 shows, the upper pair of chucks 302 is fixed to a testing device, while the lower pair of chucks 303 is caused to move downward by a movable member 304 at a speed of 100 mm/min to apply a pulling force to the test specimen 300.

The reason why the ambient temperature was set at 110° C. is that is adopted the lower value 110° C. of the temperature range of 110 to 130° C. which is suitable for three-dimensionally preforming a film having a lower softening point. By carrying out molding at as low working temperature as possible, it is possible to prevent thermal deterioration of the ink of the decorative layer and thermal deterioration of foil-decorating sheet 4. The reason why the speed of pulling the test specimen 300 was set at 100 mm/min is that the value corresponds to the lowest value of speed used when foil-decorating sheet 4 is elongated for three-dimensional preforming thereof.

The tensile elongation at break used in the above described embodiment of the present invention means elongation at rupture or elongation at break as obtained in a tensile test carried out with a test specimen 300 of the foil-decorating sheet, 80 mm wide, held between the pair of chucks 302, 303 and fixed at a distance of 100 mm between the opposite edges of the chucks, by applying a load at constant rate of 100 mm/min under the ambient temperature condition of 110° C., that is, an elongation at which the test specimen 300 is broken. Measurements of the maximum elongations of the foil-decorating sheets made with respect to several foil-decorated molded articles tell that in the case of molding, the elongation is 150 to 200%; 170 to 230% in the case of wheel cover; 170 to 280% in the case of side mudguard; 200 to 350% in the case of bumper; 180 to 400% in the case of console box; 170 to 300% in the case of center cluster; and 170 to 350% in the case of switch base. Therefore, in the present embodiment, the lower limit of these values, that is, 150% or more is taken as tensile elongation at break.

Examples of the acrylic film 1 used in the present embodiment are films including polymethyl methacrylate, polymethyl acrylate, or a derivative thereof as a principal component, with acrylic rubber included therein. Also, the acrylic film 1 embraces laminated films in which a polystyrene film is sandwiched between acrylic films.

These acrylic films 1 singly exhibit considerable elongation behavior under a low load, say, a tensile-elongation-at-break of not less than 150% as measured in a tensile test carried out with a test specimen 300, 80 mm wide, held between the pair of chucks 302, 303 fixed at a distance of 100 mm between the opposite edges of the chucks, by applying a load to one end of the test specimen 300 at constant rate of 100 mm/min under the ambient temperature condition of 110° C.

Where the molding resin 10 is polypropylene resin, the bonding surface-side film 3 of laminate films which is bonded to the molding resin is preferably a polypropylene film. Where conversion into a three-dimensional configuration is required, it is necessary to bring the bonding surface-side film closer to acrylic film 1 in not only adhesive property but also mechanical properties. Therefore, polypropylene film, which has a larger room for selection of a film having various properties as compared with polyethylene film, is suitable for the purpose. Specifically, in the case of automotive exterior trims, such as molding, side mudguard, bumper, and wheel cover, where heat resistance, water resistance, and recycling adaptability are required, polypropylene film is preferred because polypropylene film has high heat resistance, high water resistance, and good recycling adaptability. More specifically, the polypropylene film is preferably such that when a tensile test is carried out with a test specimen 300 of the foil-decorating sheet, 80 mm wide, held between the pair of chucks 302, 303 fixed at a distance of 100 mm between the opposite edges of the chucks, by applying a load at constant rate of 100 mm/min under the ambient temperature condition of 110° C., the elongation observed at rupture of the test specimen 300 is not less than 150%.

The polypropylene film varies in its elongation behavior depending upon difference in composition, and method of fabrication thereof. Therefore, polypropylene films shown in (1) to (3) below are preferred for selection since their elongation behavior is similar to that of the acrylic film.

(1) Polypropylene film comprising polypropylene resin loaded with a rubber-based resin, for example, ethylene-propylene copolymer rubber or styrene elastomer resin in a suitable proportion:

To obtain this polypropylene film, 0.3 to 2 parts by weight of ethylene-propylene copolymer rubber may be added to 10 parts by weight of polypropylene resin, or 0.5 to 2 parts by weight of styrene elastomer resin may be added to 10 parts by weight of polypropylene resin. By so doing it is possible to improve the tensile elongation at break.

(2) Polypropylene film comprising non-crystalline or low-crystalline polypropylene resin:

As compared with a polypropylene film comprised of a crystalline polypropylene resin, this polypropylene film exhibits a higher elongation behavior and function under a smaller load. It is noted, however, that such a non-crystalline or low-crystalline polypropylene resin has a low softening point and, in many cases, it is sticky and difficult to work with. It is desirable, therefore, that this polypropylene resin be covered with a thin crystalline polypropylene resin on both sides to be formed into a film of a three layer structure (10 μm thin film crystalline polypropylene resin/100 μm non-crystalline or low crystalline polypropylene resin/10 μm thin film crystalline polypropylene resin or the like).

(3) Polypropylene film comprised of a soft propylene resin polymerized by a metallocene catalyst:

The soft propylene resin polymerized by the metallocene catalyst within a particular low molecular-weight distribution exhibits a higher elongation and function under a smaller load as compared with crystalline polypropylene resin, and this provides favorable effect with respect to the tensile elongation at break of polypropylene film. It is noted that the metallocene catalyst is a catalyst composed of metallocene and methylaminoxane. This catalyst allows propylene monomer to be disposed at or inserted into a meso position or racemic position polypropylene resin; and this effectively makes it possible to obtain a syndiotactic polypropylene which is low crystalline, less rigid, and flexible.

Polypropylene films shown in (1) to (3) above singly exhibit considerable elongation behavior under a low load, say, a tensile elongation of not less than 150% at break as measured in a tensile test carried out with a test specimen 300, 80 mm wide, held between the pair of chucks 302, 303 fixed at a distance of 100 mm between the opposite edges of the chucks, by applying a load to one end of the test specimen 300 at constant rate of 100 mm/min under the ambient temperature condition of 110° C. It is noted that a polypropylene film comprised of a crystalline polypropylene resin should not be selected.

Where a resin molded article 11 is formed of acrylonitrile butadiene styrene resin, the bonding surface-side film 3 of laminate films to be bonded to the molding resin is preferably one of acrylonitrile butadiene styrene films. Where conversion into a three-dimensional configuration is required, it is necessary to bring the bonding surface-side film closer to acrylic film 1 in not only adhesive property but also mechanical properties. As compared with acrylonitrile styrene film, one of acrylonitrile butadiene styrene films is preferred which can be made easier to covert into a three-dimensional configuration and closer to acrylic film 1 in mechanical properties by changing the butadiene content. Specifically, in the case of automotive interior parts, such as console box, center cluster, and switch base, of which heat resistance and shock resistance are required, one of acrylonitrile butadiene styrene films is preferred which have high heat resistance and high shock resistance. More specifically, the acrylonitrile butadiene styrene film is preferably such that when a tensile test is carried out with a test specimen 300, 80 mm wide, held between the pair of chucks 302, 303 fixed at a distance of 100 mm between the opposite edges of the chucks, by applying a load to one end of the test specimen 300 at constant rate of 100 mm/min under the ambient temperature condition of 110° C., the elongation measured at rupture of the test specimen 300 is not less than 150%.

Acrylonitrile butadiene styrene films vary in their behavior and heat resistance depending upon the copolymerization ratio. Butadiene is a rubber-based resin and is highly stretchable. By increasing the butadiene content, the acrylonitrile butadiene styrene film can be made to have an elongation behavior similar to that of acrylic film 1. On the other hand, however, other physical properties, such as heat resistance, are lowered. Therefore, tests were made with respect to butadiene contents which enable to maintain various physical properties and exhibit a large elongation behavior under a low load. As a result, it was found that where the butadiene content was within a range of 20 to 50% by weight, especially 30 to 45% by weight, the film maintained an elongation behavior similar to that of the acrylic film 1, and there was no significant degradation in physical properties.

In the foregoing statement, polypropylene films having higher softening points and acrylonitrile butadiene styrene films having higher butadiene component contents are described in detail. As an alternative, mention may be made of an amorphous polyethylene terephthalate film. In the foregoing embodiment of the present invention, the foil-decorating sheet 4 may be of two layer structure or three layer structure.

In selecting the bonding surface-side film 3 to be bonded to the molding resin, it is ideal to select a film such that tensile elongation load curves of respective component films substantially coincide. However, even if the tensile elongation load curves do not coincide, by selecting one which is within a range of up to 5.0 kg in the difference of loads relative to elongation values of respective component films of the laminated film in a range where each of the values reaches the upper limitation of the tensile elongation at break, favorable results can be obtained (see FIG. 5).

The term "tensile elongation load curve" used herein means a curve depicting the relation of tensile elongation of material and a load applied until the rupture of the material on the basis of tests carried out of a test specimen of the material, i.e., the test specimen 300 (80 mm wide, held between the pair of chucks 302, 303 fixed at a distance of 100 mm between the opposite end edges of the chucks in the embodiment of the present invention), with load as ordinate and elongation of material (increase in length of test specimen in the direction of pull over initial length (100 mm in the embodiment of the present invention) of test specimen in the direction of pull, expressed in percentage) as abscissa, to find mechanical properties of the material when the test specimen was pulled at a given speed (100 mm/min in the embodiment of the present invention).

The foil-decorating sheet 4 may have a portion such that a unit area is elongated 200% or more to preform a three-dimensional configuration. With respect to the above mentioned case in which the foil-decorated resin molded article 11 was obtained, the decoration of the portion of the foil-decorating sheet 4 which has the largest elongation was examined, and it was found that in the case of molding, the largest elongation was of the order of 205% in area ratio; 290% in the case of wheel cover; 310% in the case of side mudguard; 360% in the case of bumper; 330% in the case of console box; 280% in the case of center cluster; and 340% in the case of the switch base. In the present embodiment of the present invention, therefore, 200% or more, the lowest value of the above mentioned elongation ranges is taken as elongation limit. The percentage 200% herein means that the area of the portion is elongated to two times as large area as the original area.

The thickness of the foil-decorating sheet 4 is preferably 50–2000 $\mu$m. If the thickness is thinner than 50 $\mu$m, when the molding resin 10 is injected, wrinkles will be caused to the foil-decorating sheet due to heat pressure of the molding resin 10. If the thickness is more than 2000 $\mu$m, the moldability of the foil-decorating sheet is deteriorated and this makes it difficult to preform the foil-decorating sheet for conversion into a three-dimensional configuration. In particular, a thickness range of 50 to 700 $\mu$m is preferred. The foil-decorating sheets 4 within this thickness range are easy to work with in punching or cutting the sheet into a desired shape, or inserting the sheet into the mold for injection molding. Further, since the foil-decorating sheet 4 is highly formable, the foil-decorating sheet 4 can be configured into a three-dimensional shape in a short time. If the thickness exceeds 700 $\mu$m, it is difficult to make the sheet into a foil-decorating sheet in a roll state, and this will result in low productivity. In a case where three-dimensional preforming is carried out in a movable mold 5 of an injection mold, trimming of unnecessary portions of the foil-decorating sheet 4 is required after molding operation. In this case, therefore, a slightly thinner range, say, 50 to 200 $\mu\mu$m is preferred. In a case where preforming for conversion into a three-dimensional shape is carried out in a separate mold different from the injection mold, a stage for insertion of the sheet into such a three-dimensional preforming mold is required, in which case rigidity is required of the foil-decorating sheet 4. Therefore, a slightly thicker range, say, 300 to 700 $\mu$m, is preferred.

The thickness of acrylic film 1 is preferably 30 to 700 $\mu$m. If the thickness is less than 30 $\mu$m, the film is of low strength, is liable to crack, and lacks weathering resistance. If the thickness exceeds 700 $\mu$m, it is difficult to wind the foil-decorating sheet into a rolled sheet, which results in low production efficiency. More preferably, the thickness range is 30 to 200 $\mu$m. When the acrylic film is thin as in this thickness range, the length of acrylic film which can be wound on one roll is increased, resulting in higher production efficiency.

As already stated, the foil-decorating sheet 4 of the embodiment of the present invention includes a decorative layer 2 (see FIGS. 1 to 4, 6, and 10 to 12). The decorative layer 2 is intended to display characters, figures, symbols, and the like, and/or a colored surface on the surface of a resin molded product 11. The decorative layer 2 may be a totally solid, one color layer, such as black or silver metallic, with no pattern, or a mono-color or multi-color layer, with a pattern, such as wood grain or stone grain. Alternatively, the decorative layer 2 may be a mono-color or multi-color layer having a wood grain or stone grain pattern. Or the decorative layer 2 may display a totally solid or patterned gold color laminate by laminating a totally solid or patterned transparent yellow color and a totally solid or patterned silver metallic layer. The decorative layer 2 may comprise at least one layer selected from the group consisting of a pigment containing ink layer composed of pigment and resin binder, a glitter pigment layer composed of pearl pigment and resin binder, and dye/ink layer composed of dye and resin binder. Such a decorative layer 2 may be formed by conventional printing method, such as offset printing, gravure printing, or screen printing, or coating method, such as roll coat method or spray coat method. The thickness of the decorative layer 2 is preferably 0.1 to 20 $\mu$m. According to the conventional printing technique, the thickness is within this range.

As a specific example of the decorative layer 2, there is the above-described wood grain pattern which is often used for automotive interior trims. Generally, a wood grain pattern is composed of a wood grain duct decorative layer expressing a wood grain leaf veins and peripheral minute ducts, and a base layer which gives direct influence on the hue of the wood grain pattern as a whole. This arrangement is shown as a modified form of the present embodiment in FIGS. 7 and 8. In the modified form of FIG. 7, the wood grain pattern is disposed as a decorative layer 2 between the acrylic film 1 and the bonding surface-side film 3 in adjacent relation to the acrylic film 1 and is composed of a wood grain duct decorative layer 14 and a base layer 15. A colored layer 16 is disposed between the base layer 15 and the bonding surface-side film 3. In another modified form shown in FIG. 8, a decorative layer 2 is disposed between a colored layer 17 which concurrently functions as the bonding surface-side film 3 and the acrylic film 1, and is composed of a base layer 15 having wood grain duct decorative layers 14 in intermittent relation.

Specifically, the base layer 15 is formed by conventional printing method using an ink-form liquid prepared in such a way that pigments, such as yellow, red, brown, and black, which are used to express wood grain, are mixed with resin binder and solvent for conversion into the ink form liquid. The base layer 15 may be a single layer or multiple layer construction. The base layer 15 may be a patterned partial layer or a wholly solid layer.

In the case of a resin molded article 11 having a large draw depth at its end portion in particular, when three-dimensionally preformed, the decorative layer 2 is partially extended and thus, is made see-through, so that the design quality is lowered. Therefore, it is desirable to place under the base layer 15 a colored layer 16 (see the modified form in FIG. 7) isochromatic with the color of the base layer 2 or a colored film 17 (see another form in FIG. 8). The colored film 17 may be made to concurrently function as the bonding surface-side film 3, which is bonded to the molding resin 10, in the laminate film (see FIG. 8). In the embodiment of the present invention, the color of the base layer 15 is defined as a color within a visible range (the range of symbol V in FIG.

Figure 8:
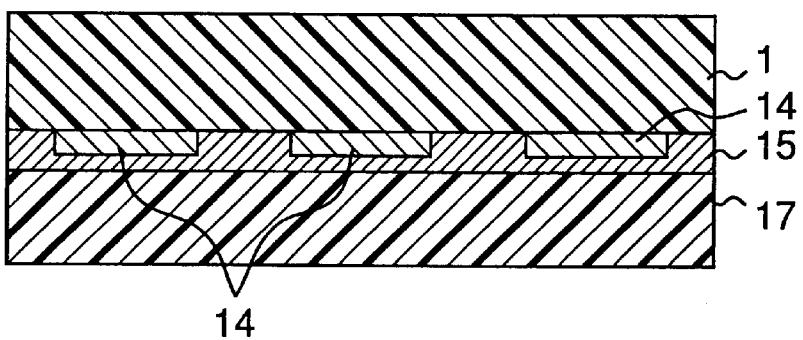
FIG. 8 is a sectional view showing the foil-decorating sheet of still another modified form of aforesaid embodiment of the invention.
Figure 9:
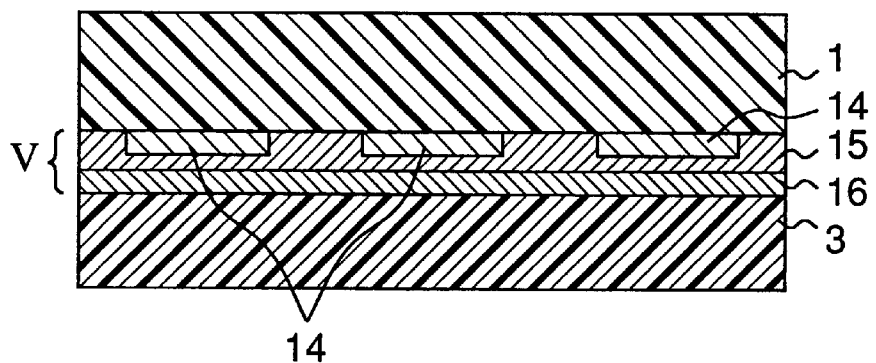
FIG. 9 is a sectional view of the FIG. 7 foil-decorating sheet for explaining a visually recognizable scope of the sheet as the base layer.

9 showing a modified form of FIG. 8) in which the color can be visually recognized when viewed from the acrylic film side (see FIG. 9). The thickness of the colored layer 16 or colored film 17 is preferably not less than 1 μm. If the thickness is less than 1 μm, when the foil-decorating sheet 4 is preformed into a three-dimensional shape, the colored layer 16 or colored film 17 is made see-through. Therefore, such a thickness is unsatisfactory.

The term "isochromatic" used in above described embodiment of the present invention means the chromaticity difference between the color of the base layer 15 and the color of the colored, layer 16 or the colored film 17 is such that in the L* a* b* calorimetric system having a perceptibly substantially equal chromaticness, as recommended by the International Commission on Illumination (Commission Internationale de l'Eclairage, CIE) in 1976, the total of the differences between a* and b* defined by $a^*=500 [(X/X_0)^{1/3}-(Y/Y^0)^{1/3}]$ and $b^*=200[(Y/Y^0)^{1/3}-(Z/Z^0)^{1/3}]$, that is, the value of the following Equation 2 is not less than 4.0 but not more than 45.0. In the equation, L* denotes lightness index defined as $L^*=116 (Y/Y^0)^{1/3}-16$; X, Y, Z denotes stimulus values felt by three chromatic characteristics of luminosity respectively at the sight of the color of an object with human eyes, $X^0$, $Y^0$, $Z^0$ denotes stimulus values felt by three chromatic characteristics of luminosity it respectively at the sight of the illumination source with human eyes; in the case of the standard illuminant C, $X_0=98.072$, $Y^0=100$, and $Z_0=118.225$, and in the case of the standard illuminant $D_{65}$, $X_0$ 32 95.045, $Y^0=100$, and $Z_0=108.892$.

Equation 2 is as follows:

$$\sqrt{(\Delta a^*)^2+(\Delta b^*)^2}$$

In Equation 2, if the value of the equation exceeds 45.0, the color difference between the elongated portion and the not-elongated portion is too much noticeable. If the value is less than 4.0, the base layer 15 becomes unnecessary because the colored layer 16 or colored film 17 which is visually isochromatic with the base layer 15 has a function to serve as the base layer 15.

In this way, by so arranging that the colors of the base layer 15 and colored layer 16 or colored film 17 which constitute the decorative layer 2 are isochromatic, when a shape change is caused to the foil-decorating sheet 4, color change of the decorative layer 2 can be prevented by the colored layer 16 or colored film 17 even if the base layer 15 is made see-through.

The decorative layer 2 may be comprised of a thin metal layer or a combination of a thin metal layer and a printed layer. The thin metal layer is formed by vacuum vapor deposition, sputtering, ion plating, plating, or the like. For the material, metals, such as aluminum, nickel, gold, platinum, chromium, iron, copper, tin, indium, silver, titanium, lead, or zinc, or alloys or compounds of these metals, are used according to the metallic luster color desired to display.

Decorative layer 2 is formed between two or more kinds of films (for example, acrylic film 1) and a film (for example, bonding surface-side film 3 or colored film 17) constituting a laminated film as a foil-decorating sheet 4. To obtain such a construction, an acrylic film 1 is used as printing raw material film and a decorative layer 2 is formed on the surface of the acrylic film 1. Then, the bonding surface-side film 3 which is to be bonded to the molding resin 10 may be laminated on the decorative layer 2 in such a way as to cover the decorative layer 2 by the laminating method. Alternatively, to obtain such a construction, the bonding surface-side film 3 to be bonded to the molding resin 10 is used as a printing raw material film, and a decorative layer 2 is formed on the surface thereof. Then, an acrylic film 1 is laminated on the surface of the decorative layer 2 by the laminating method in such a way as to cover the decorative layer 2. As the laminating method, there are methods such as a so-called heat laminate method in which one film is heated until its surface becomes adhesive and the other film is bonded thereto, and dry laminate method in which two sheets of films are bonded together via an adhesive. There is also a so-called extrusion coating method in which a resin mass which will become a film material (polypropylene in particular) is extruded onto a film with a decorative layer 2 formed thereon in such a way as to cover the decorative layer 2. In the case of the extrusion coating method, to obtain a tensile elongation-at-rupture curve for a single film, a film which has been formed of a film extrusion-molded to the above mentioned thickness with the use of resin material alone which becomes a film material can be substituted.

Figure 6:
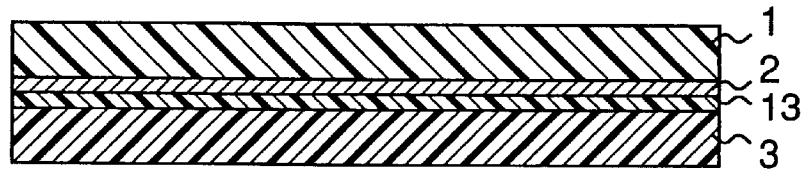
FIG. 6 is a sectional view showing the foil-decorating sheet of a modified form of aforesaid embodiment of the invention.
Figure 7:
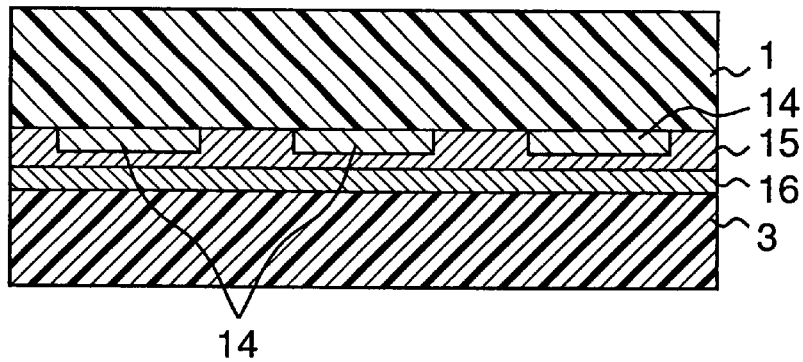
FIG. 7 is a sectional view showing the foil-decorating sheet of another modified form of aforesaid embodiment of the invention.

In order to improve the adhesion properties of the acrylic film 1 and the bonding surface-side film 3 which is to be bonded to the molding resin 10, an adhesion layer 13 may be provided as shown in FIG. 6. The adhesion layer 13 may be formed of a polyvinyl chloride—vinyl acetate copolymer resins, acrylic resins, or urethane resins.

Next, the method of fabricating a foil-decorating resin molded article in the above described embodiment of the present invention will be described.

First, the foil-decorating sheet 4 is set by the clamping member 8 onto the surface of the movable mold which serves as the injection mold (see FIG. 1).

As one method of setting the sheet onto the movable mold 5, one example will be given. A foil-decorating continuous sheet 4 is wound on a roll shaft into a roll form once, and this roll-up sheet is placed on a top portion of the movable mold 5 for injection molding which is integrally movably with the movable mold 5. While being rewound from the roll-up sheet, the foil-decorating sheet 4 is allowed to pass through the space between the retracted movable mold 5 and the stationary mold 6 so that the foil-decorating sheet 4 is taken up by a roll shaft of a film winding means disposed in the lower portion of the movable mold 5 for injection molding which is integrally movably therewith. In another example, the foil-decorating sheets 4 in leaf form may be manually or robotally set on the surface of the movable mold. In setting the foil-decorating sheets 4 on the surface of the movable mold 5, after the foil-decorating sheet 4 is located on the surface of the movable mold 5, the position of the foil-decorating sheet 4 relative to the surface of the movable mold 5 is determined by a positioning sensor or the like, then the foil-decorating sheet 4 is pressed against the surface of the movable mold 5 for injection molding by the clamping member 8.

Then, after the foil-decorating sheet 4 is set on the surface of the movable mold 5 for injection molding, foil-decorating sheet 4 is vacuum-sucked through vacuum suction holes 12 formed on the movable mold 5 so as to be allowed to run along the cavity defining surface 7 of the movable mold 5, whereby the foil-decorating sheet is three-dimensionally preformed so as to conform to the cavity defining surface 7 of the recessed portion, that is, a cavity 20, of the movable mold 5 (see FIG. 2). As a specific example, there is a method such that the foil-decorating sheet set on the surface of the movable mold 5 is heated by means of a heating plate or the like to a temperature equal to or higher than the softening point of the sheet to become softened with the heating plate inserted between the movable mold 5 and the stationary mold 6; the space defined between the recessed portion of the movable mold 5 for injection molding and foil-decorating sheet 4 is tightly closed and evacuated and vacuum-sucked through vacuum suction holes 12 so that the foil-decorating sheet 4 is caused to closely adhere to the interior surface of the recessed portion of the injection molding movable mold 5 (cavity defining surface 7). When carrying out three-dimensional preforming or pressing the foil-decorating sheet 4 by means of the clamping member 8 to fix in position, punching work may be carried out with respect to any unnecessary portion of the foil-decorating sheet 4.

Instead of the above method, before the foil-decorating sheet 4 is set on the movable mold 5 for injection molding, foil-decorating sheet 4 may be previously three-dimensionally preformed (see FIG. 10) to a desired shape and punched to a desired shape by using a separate three-dimensional preforming mold different from the movable mold 5 and the stationary mold 6 for injection molding (see FIG. 10), and thereafter the three-dimensionally preformed foil-decorating sheet 4 may be fitted in the recessed portion of the movable mold 5 for injection molding (see FIG. 11). The term "three-dimensional preforming" used herein means converting the shape of the foil-decorating sheet 4 from a planar shape to a three-dimensional shape (for example, deep-bottomed console box). The desired shape may be a shape conforming to the cavity defining surface 7 of the movable mold 5 or the stationary mold 6. For the three-dimensional preforming, there are vacuum forming method, air-pressure forming method, press forming method in which heated rubber is pressed against the object, or press forming method. The vacuum forming method is such that the foil-decorating sheet 4 is heated to a temperature equal to or higher than the softening point to become softened, the space between the recessed portion of a vacuum forming mold and the foil-decorating sheet 4 is tightly closed, and vacuum suction is carried out to cause the foil-decorating sheet 4 to closely adhere to the interior surface of the recessed portion of the vacuum forming mold, whereby the foil-decorating sheet 4 is preformed into a foil-decorating sheet having a three-dimensional configuration conforming to the cavity defining surface 7 of the movable mold 5 for injection molding. For the method of punching to the desired shape, there are a Thomson punching method or a pressing method using a mold, or the like. As punched configuration there are lines extending along an outer periphery of a given configuration, holes of a given shape, or the like. In the three-dimensionally preforming, the punching may be carried out simultaneously.

Next, the movable mold 5 is clamped against the stationary mold 6. Then, molding resin 10 in a molten state is injected into the cavity 20 through the gate portion 9 of the stationary mold 6, and the molding resin 10 is solidified so that a resin molded article 11 is formed within the cavity 20 and simultaneously therewith the bonding surface-side film 3 of the foil-decorating sheet 4 is integrally bonded to the surface of the molded article 11 (see FIGS. 3 and 12).

Thereafter, the resin molded article 11 is removed from the movable mold 5. Then, unnecessary portion of the foil-decorating sheet 4 which is attached on the resin molded article 11 is removed (see FIG. 4). As described above, where punching to a given shape is previously carried out, work for removing an unnecessary portion of the foil-decorating sheet 4 is unnecessary.

The movable mold 5 and the stationary mold 6 as the injection mold are not limited to the foregoing embodiment. A molding assembly is usable which comprises a movable mold 5 and a stationary mold 6 and having a gate portion 9 for injecting the molding resin 10, so that by the stationary mold 6 and the movable mold 5 being clamped together a singular or plural cavities 20 are formed with the cavities 20 defined by the cavity defining surfaces 7 of the movable mold 5 and the stationary mold 6. The foil-decorating sheet 4 set within the cavity 20 defined between the movable mold 5 and the stationary mold 6 for injection molding covers the cavity defining surface 7. The cavity 20 may be one which defines a hole in the resin molded article 11. The recessed portion for defining the cavity 20 may be formed in one of the stationary mold 6 and the movable mold 5. The movable mold 5 or the stationary mold 6 may have the clamp member 8 for pressing the foil-decorating sheet 4 to fix it in position in the periphery of the recessed portion (see FIGS. 1 to 3). The clamp member 8 may be set in either the stationary mold 6 or the movable mold 5.

In the case of a horizontal injection mold, the above description is just applicable as it is, but it is understood that in the case of a vertical injection mold, the relation of the stationary mold and the vertical mold is reversed. The above description is applicable not only in the case of two-plate injection mold, but in the case of a three-plate injection mold as well.

The molding resin 10 is not particularly limited. Typical examples of the molding resins used in automotive interior and exterior trims are a heat-resistant acrylonitrile butadiene styrene resin containing α-methyl styrene, an acrylonitrile butadiene styrene resin alloyed with polycarbonate, a talc-containing polypropylene resin, a modified polypropylene resin, and the like.

More specific examples are given below.

EXAMPLE 1

A gold color polypropylene resin-made automotive wheel cover was fabricated under the following conditions.

A decorative layer was formed on an acrylic film by using a transparent yellow color acrylic resin based ink, and on the decorative layer was formed a metallic vapor deposit layer comprised of a 600 Å thick aluminum deposit. A post-anchor layer was formed on the vapor deposit layer by using a vinyl resin-based ink containing an aluminum pigment (including a transparent yellow pigment); and an adhesive layer was formed thereon by using a urethane resin-based dry laminate adhesive.

A polypropylene film of gray color comprised of an isotactic polypropylene resin (10 parts by weight) containing carbon black/titanium white=1/8, and an ethylene-propylene copolymer rubber (1 part by weight) was used to form a laminate with the acrylic film.

Mechanical characteristics of the acrylic film and the polypropylene film and of a laminate film of these films are shown in Table 1. Chromatic characteristics of these films are shown in Table 2.

TABLE 1

| | Thickness | Tensile elongation at break at 110° C. | Load at 50% elongation | Load at 100% elongation | Load at 150% elongation | Elongation/load at maximum load difference |
|---|---|---|---|---|---|---|
| Acrylic film | 125 μm | 290% | 1.3 kg | 1.6 kg | 1.8 kg | 280%/2.2 kg |
| Polypropylene film | 200 μm | 570% | 0.7 kg | 2.2 kg | 2.6 kg | 280%/3.9 kg |
| Laminate film | 332 μm | 280% | 1.0 kg | 1.9 kg | 2.3 kg | 280%/3.4 kg |

TABLE 2

| | Object | a* | b* | Δa* | Δb* | Color difference |
|---|---|---|---|---|---|---|
| Base layer | Transparent yellow acrylic resin layer/aluminum deposition layer/post-anchor layer | 10 | 35 | 7 | 29 | 29.8 |
| Colored film | Gray color polypropylene | 3 | 6 | | | |

A foil-decorating sheet obtained in above mentioned manner was set in a movable mold for injection molding, vacuum-formed and, after clamping, a polypropylene molding resin containing talc was injected into the cavity. Then, the polypropylene molding resin was solidified to form a resin molded article, and simultaneously therewith the polypropylene film-side surface of the polypropylene foil-decorating sheet was integrally bonded to the surface of the resin molded article. Thus, a gold color polypropylene resin-made automotive wheel cover was obtained. The foil-decorated resin molded article obtained in this way had no peel or breakage of the foil-decorated sheet.

EXAMPLE 2

A polypropylene resin-made automotive bumper of chrome color was fabricated under the following conditions.

A metal deposition layer comprised of 300 Å thick chrome vapor deposition was formed as a decorative layer on an acrylic film, and thereon was formed an anchor layer using a vinyl resin based ink. An adhesive layer was formed on the anchor layer, using an urethane resin based dry laminate adhesive.

A polypropylene film of gray color comprised of a syndiotactic polypropylene resin containing carbon black/cadmium yellow/titanium white=1/5/8 as a metallocene catalyst was used to form a laminate with the acrylic film.

Mechanical characteristics of the acrylic film and polypropylene film and of a laminate film of these films are shown in Table 3. Chromatic characteristics of these films are shown in Table 4.

TABLE 3

| | Thickness | Tensile elongation at break at 110° C. | Load at 50% elongation | Load at 100% elongation | Load at 150% elongation | Elongation/load at maximum load difference |
|---|---|---|---|---|---|---|
| Acrylic film | 75 μm | 250% | 1.2 kg | 1.4 kg | 1.5 kg | 140%/1.5 kg |
| Polypropylene film | 200 μm | 180% | 1.4 kg | 2.8 kg | 3.6 kg | 140%/3.9 kg |
| Laminate film | 279 μm | 170% | 1.4 kg | 2.7 kg | 3.0 kg | 140%/3.3 kg |

TABLE 4

| | Object | a* | b* | Δa* | Δb* | Color difference |
|---|---|---|---|---|---|---|
| Base layer | Transparent deposition layer | 2 | 26 | 1 | 25 | 25.0 |
| Colored film | Gray color polypropylene | 3 | 5 | | | |

A foil-decorating sheet obtained in above mentioned manner was set in a movable mold for injection molding, vacuum-formed and, after clamping, a modified polypropylene molding resin was injected into the cavity. Then, the modified polypropylene molding resin was solidified to form a resin molded article, and simultaneously therewith the polypropylene film-side surface of the polypropylene foil-decorating sheet was integrally bonded to the surface of the resin molded article. Thus, a chrome color polypropylene resin-made automotive bumper was obtained. The foil-decorated resin molded article obtained in this way had no peel or breakage of the foil-decorated sheet.

EXAMPLE 3

An acrylonitrile butadiene styrene resin-made automotive console panel of woodgrain pattern was fabricated under the following conditions.

A woodgrain duct decorative layer was formed as a first decorative layer on the acrylic film by using a vinyl resin based ink containing a black color pigment (carbon black), and a sheen pigment layer was formed thereon as a second decorative layer by using a vinyl resin based ink containing a yellow pearl pigment, and a woodgrain base layer was formed thereon as a third decorative layer by using a vinyl chloride resin based ink containing a brown color pigment (red oxide).

An acrylonitrile butadiene styrene film of brown color comprising a copolymer of acrylonitrile: butadiene: styrene in a copolymerization ratio of 20:35:45 (wt %) which contains carbon black/iron oxide=1/6 was used as such, and this film was heat-laminated with the acrylic film at 100° C.

Mechanical characteristics of the acrylic film and the acrylonitrile butadiene styrene film and of a laminate film of these films are shown in Table 5. Chromatic characteristics of these films are shown in Table 6.

TABLE 5

| | Thickness | Tensile elongation at break at 110° C. | Load at 50% elongation | Load at 100% elongation | Load at 150% elongation | Elongation/load at maximum load difference |
|---|---|---|---|---|---|---|
| Acrylic film | 200 μm | 260% | 1.2 kg | 1.3 kg | 1.6 kg | 20%/ 0.8 kg |
| Acrylonitrile butadiene styrene film | 150 μm | 210% | 2.1 kg | 3.9 kg | 4.1 kg | 20%/ 3.2 kg |
| Laminate film | 355 μm | 230% | 1.7 kg | 3.3 kg | 3.7 kg | 20%/ 2.8 kg |

TABLE 6

| | Object | a* | b* | Δa* | Δb* | Color difference |
|---|---|---|---|---|---|---|
| Base layer | Brown pigment woodgrained base layer | 32 | 43 | | | |
| | | | | 5 | 18 | 18.7 |
| Colored film | Dark-brown acrylonitrile butadiene styrene | 27 | 25 | | | |

A foil-decorating sheet obtained in above mentioned manner was set in a movable mold for injection molding, vacuum-formed and, after clamping, a heat-resistant acrylonitrile butadiene styrene molding resin was injected into the cavity. Then, the heat resistant acrylonitrile butadiene styrene molding resin was solidified to form a resin molded article, and simultaneously therewith the acrylonitrile butadiene styrene film-side surface of the polypropylene foil-decorating sheet was integrally bonded to the surface of the resin molded article. Thus, a woodgrain patterned heat resistant acrylonitrile butadiene styrene resin made console box was obtained. The foil-decorated resin molded article obtained in this way had no peel or breakage of the foil-decorated sheet.

COMPARATIVE EXAMPLE

In the same way as in Example 1, a polypropylene resin made automotive wheel cover of gold color was fabricated, except that a biaxially oriented 50 μm thick polypropylene film of red color was used instead of the 200 μm thick polypropylene film of gray color used in Example 1.

Mechanical characteristics of the acrylic film and the polypropylene film and of a laminate film of these films are shown in Table 7. Chromatic characteristics of these films are shown in Table 8.

TABLE 7

| | Thickness | Tensile elongation at break at 110° C. | Load at 50% elongation | Load at 100% elongation | Load at 150% elongation | Elongation/load at maximum load difference |
|---|---|---|---|---|---|---|
| Acrylic film | 125 μm | 290% | 1.3 kg | 1.6 kg | 1.8 kg | 90%/ 1.6 kg |
| Polypropylene film (biaxially oriented) | 50 μm | 90% | 4.8 kg | — | — | 90%/ 9.4 kg |
| Laminate film | 182 μm | 90% | Interlaminate film peel at 20% elongation | — | — | — |

TABLE 8

| | Object | a* | b* | Δa* | Δb* | Color difference |
|---|---|---|---|---|---|---|
| Base layer | Transparent yellow acrylic resin layer/ aluminum deposition layer/post-anchor layer | 10 | 35 | | | |
| | | | | 35 | 35 | 49.5 |
| Colored film | Gray color polypropylene | 45 | 0 | | | |

In this foil-decorating sheet, when the sheet was elongated 20%, peeling occurred between the laminate films and the elongated portion was discolored into reddish brown color and was of poor design quality.

The present invention adopts above described arrangement and, therefore, has the following advantages.

That is, in a foil-decorating sheet comprised by a laminate film of two or more kinds of films which is to be set in an injection mold for being integrally bonded to the surface of a molding resin, after a foil-decorating processing is performed, a film of the laminated film which is on the side of the surface to be bonded to the molding resin has a peel strength of not less than 1 kgf/inch width at least at the interface between the surface film of the laminated film bonded to the molding resin and the molding resin, and at least a transparent acrylic film is laminated on the surface film bonded to the molding resin, with a decorative layer formed between the surface film bonded to the molding resin and the acrylic film. This ensures good bonding relation with the molding resin so that there is no possibility of peeling off from the molding resin. Further, since the acrylic film which is brittle and liable to crack is supported by the film surface which is bonded to the molding film, the foil-decorating sheet will not be broken.

The method of producing a foil-decorated resin molded article comprises setting in an injection mold the previously three-dimensionally preformed foil-decorating sheet, or three-dimensionally preforming the foil-decorating sheet in the injection mold, so that the foil-decorating sheet and the molding sheet is integrated by injection molding. Therefore, a foil-decorated resin molded article can be easily obtained.

The entire disclosure of Japanese Patent Application No. 9-212598 filed on Jul. 22, 1997, and Japanese Patent Application No. 10-82739 filed on Mar. 13, 1998, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A foil-decorating sheet comprising a laminated film which is to be set in an injection mold for being integrally bonded to a surface of a molding resin, wherein after the foil-decorating sheet is made, a bonding surface-side film of the laminated film which is on a side of a surface to be bonded to the molding resin has a peel strength of not less than 1 kgf/inch width at least at an interface between the molding resin and the bonding surface-side film of the laminated film bonded to the molding resin, and wherein at least a transparent acrylic film is laminated on the bonding surface-side film bonded to the molding resin, with a decorative layer formed between the acrylic film and the bonding surface-side film bonded to the molding resin, wherein the order of the layers in increasing distance from the mold is transparent acrylic film, decorative layer and surface-side film, wherein the bonding surface-side film of the laminated film which is bonded to the molding resin is a polypropylene film and wherein the polypropylene film comprises a polypropylene resin loaded with a styrene elastomer resin.

2. A foil-decorating sheet comprising a laminated film which is to be set in an injection mold for being integrally bonded to a surface of a molding resin, wherein after the a foil-decorating sheet is made, a bonding surface-side film of the laminated film which is on a side of a surface to be bonded to the molding resin has a peel strength of not less than 1 kgf/inch width at least at an interface between the molding resin and the bonding surface-side film of the laminated film bonded to the molding resin, and wherein at least a transparent acrylic film is laminated on the bonding surface-side film bonded to the molding resin, with a decorative layer formed between the acrylic film and the bonding surface-side film bonded to the molding resin, wherein the order of the layers in increasing distance from the mold is transparent acrylic film, decorative layer and surface-side film, wherein a colored layer or colored film is provided under the decorative layer and wherein a color of a base layer which constitutes the decorative layer and a color of the colored layer or colored film are isochromatic.

3. The foil-decorative sheet according to claim 2, wherein there is a chromaticity difference between the color of the base layer for the decorative layer and the color of the colored layer or colored film, the chromaticity difference being a value expressed by the following relation:

$$4.0 \leq \sqrt{(\Delta a^*)^2 + (\Delta b^*)^2} \leq 45.0$$

where, $a^*$, $b^*$ denotes specification units in the $L^* a^* b^*$ colorimetric system having a perceptibly substantially equal chromaticness, as recommended by International Commission on Illumination in 1976, in which $a^*=500 [(X/X_0)^{1/3}-(Y/Y_0)^{1/3}]$, $b^*=200 [(Y/Y_0)^{1/3}-(Z/Z_0)^{1/3}]$, wherein $L^*$ denotes lightness index defined as $L^*=116 (Y/Y_0)^{1/3}-16$; $X, Y, Z$ denotes stimulus values felt by three chromatic characteristics of respectively at a sight of the color of an object with human eyes, $X_0, Y_0, Z_0$ denotes stimulus values felt by three chromatic characteristics of luminosity respectively at a sight of the illumination source with human eyes; in a case of a standard illuminant C, $X_0=98.072$, $Y_0=100$, and $Z_0=118.225$, and in a case of a standard illuminant $D_{65}$, $X_0=95.045$, $Y_0=100$, and $Z_0=108.892$.

4. A foil-decorating sheet comprising a laminated film which is to be set in an injection mold for being integrally bonded to a surface of a molding resin, wherein after the foil-decorating sheet is made, a bonding surface-side film of the laminated film which is on a side of a surface to be bonded to the molding resin has a peel strength of not less than 1 kgf/inch width at least at an interface between the molding resin and the bonding surface-side film of the laminated film bonded to the molding resin, and wherein at least a transparent acrylic film is laminated on the bonding surface-side film bonded to the molding resin, with a decorative layer formed between the acrylic film and the bonding surface-side film bonded to the molding resin, wherein the order of the layers in increasing distance from the mold is transparent acrylic film, decorative layer and surface-side film, wherein the bonding surface-side film of the laminated film which is bonded to the molding resin is a colored film and wherein a color of a base layer of the decorative layer and a color of the colored film are isochromatic.

* * * * *